US008440042B2

(12) United States Patent
Ryan

(10) Patent No.: US 8,440,042 B2
(45) Date of Patent: May 14, 2013

(54) METHOD OF MANUFACTURING FLEXIBLE SHELL INLAY STRIPS

(76) Inventor: Kevin Ryan, Westminster, CA (US)

(*) Notice: Subject to any disclaimer, the term of this patent is extended or adjusted under 35 U.S.C. 154(b) by 108 days.

(21) Appl. No.: 13/245,458

(22) Filed: Sep. 26, 2011

(65) Prior Publication Data

US 2012/0247656 A1 Oct. 4, 2012

Related U.S. Application Data

(62) Division of application No. 12/221,064, filed on Jul. 29, 2008, now Pat. No. 8,053,053.

(51) Int. Cl.

| | |
|---|---|
| ***B32B 37/00*** | (2006.01) |
| ***B32B 37/02*** | (2006.01) |
| ***B32B 37/12*** | (2006.01) |
| ***B32B 38/00*** | (2006.01) |
| ***B32B 38/04*** | (2006.01) |
| ***B32B 38/18*** | (2006.01) |

(52) U.S. Cl.
USPC ............. 156/253; 156/63; 156/155; 156/296; 156/250; 156/252; 156/256; 156/264; 156/265; 156/266

(58) Field of Classification Search .................... 156/63, 156/155, 250, 252, 253, 256, 264–266, 296
See application file for complete search history.

(56) References Cited

U.S. PATENT DOCUMENTS

| | | | | |
|---|---|---|---|---|
| 5,776,581 | A | 7/1998 | Sifel et al. | |
| 6,190,491 | B1 * | 2/2001 | Sifel et al. | 156/256 |
| 8,138,404 | B1 * | 3/2012 | Petros | 84/291 |

FOREIGN PATENT DOCUMENTS

| | | | |
|---|---|---|---|
| KR | WO 01/64455 | A1 | 9/2001 |

* cited by examiner

*Primary Examiner* — Mark A Osele
*Assistant Examiner* — Christopher C Caillouet
(74) *Attorney, Agent, or Firm* — James M. Duncan, Esq.; Klein, DeNatale, Goldner

(57) ABSTRACT

A method of fabricating shell purfling strips having sufficient flexibility to be placed within a curved configuration. The shell purfling strips may be placed, as a single unit, in curved channels which require the strip to bend. The flexibility results from a laminated structure comprising a layer of binding material overlain by an organic shell layer, with a bonding agent attaching the layers together. The organic shell layer comprises a plurality of precisely placed breaks along its length. The binding material retains the individual fragments of the shell layer in the strip, but because the binding material comprises a flexible material, such as rubber, the layer of binding material is sufficiently flexible to allow the purfling strip to flex longitudinally and transversely. The shell purfling strips may be attached in parallel relationship to other perfling components allowing installation as a unit.

8 Claims, 16 Drawing Sheets

METHOD OF MANUFACTURING FLEXIBLE SHELL INLAY STRIPS

CROSS-REFERENCE TO RELATED APPLICATION

This is a divisional application of U.S. patent application Ser. No. 12/221,064 which was filed on Jul. 29, 2008, for which application this inventor claims domestic priority.

BACKGROUND OF THE INVENTION

The present invention generally relates to the construction of finely crafted wooden objects, such as musical instruments, cutlery and curios, in which the wooden object includes an inlay portion for ornamentation or functional purpose, such as inlay which forms an ornamental border adjacent to the outside edges of an instrument. An inlay is a material set within a depression or channel formed in a matrix material where, once installed, the top surface of the inlay is generally flush with the surface of the matrix material. Although many different materials may be utilized as the inlay material, organic shell materials such as abalone, oyster and snail have been found to be particularly suitable as inlay material because of the lustrous and luminescent appearance of these materials. The material traditionally used for musical instruments, such as steel-string guitars, is abalone, a shell of the mollusk family, which has attractive patterns and can reflect many different colors. Pure shell material is often referred to slab. It is cut straight from the curved inside surface of the shell and then sanded flat to uniform thickness, such as 0.050". Because the pieces are cut from the curved surface of the shell, the pieces are often sawn into odd and irregular shaped pieces, referred to as "blanks".

As recognized in U.S. Pat. No. 5,776,581 (Sifel et al.), the use of these organic shell materials for inlay purposes is problematic because of the difficulty in obtaining shell pieces of sufficient thickness. Sifel discloses a organic shell inlay blank which may be utilized as a substitute for the shell fragments utilized by the prior art. Sifel's inlay blank comprises overlapping flexible layers of organic shell material with a bonding agent disposed between the layers. Sifel's blank is referred to by those skilled in the art as ABALAM or Ablam (hereinafter collectively referred to as ABALAM). This inlay material is made by laminating extremely thin sections of shell in such a way as to render the entire surface of the sheet with beautiful, figured shell patterns. Unlike natural shell slab pieces which have a varying surface area and depth, ABALAM is perfectly flat and easier to saw into delicate patterns because of the homogeneous nature of the laminations. ABALAM is frequently preferred when large pieces of inlay material are required.

When applied as inlay materials for musical instruments, ABALAM blanks are typically sawn or cut into thin strips of uniform width (usually about 0.040-0.060" wide). These strips may be utilized for a variety of purposes, including fashioning purfling and the rosette of the instrument. "Purfling" (sometimes spelled "perfling") is the term used for a decorative border. Purfling is commonly used in conjunction with the "binding", which is seated at the outermost corner of the instrument. The binding is fashioned from pieces of wood, plastic or fiber which are heated and then bent to fit around the curved edges of the instrument. The purflings are disposed between the binding and the adjacent edges formed by the top, sides, or back of the instrument. The binding serves to protect the edges of the instrument from impacts which might otherwise initiate a crack in the top of the instrument. In contrast, the purfling is purely decorative.

The purfling, like the binding, generally follows the bends and curves of the instrument. The purling is placed in a channel preformed by the edge of the top (or sides or bottom) on one side and the edge of the binding on the other side. Once the purfling is placed within the channel, the top (or sides or bottom) of the instrument may be sanded or scraped such that the surface of the top is flush with the purfling, creating the decorative border.

When organic shell materials, such as mother-of-pearl or abalone, are used for purfling, it is often referred to as "shell purfling." Various other materials, such as wood or wood fiber, may be utilized instead of place of the shell purfling, or in combination with the shell purfling, such that the outside edge of a musical instrument may have an outside border formed with wood fiber purfling and a border of shell purfling immediately adjacent to the wood fiber purfling. The result is a crisp, dark border formed by the wood fiber which accentuates the flashy or luminescent appearance of the shell. The wood purfling, sometimes referred to as "marquetry," may comprise different colors, but is often alternating strips of light and dark material. The wood purfling may also come in different patterns, such as parallel lines or in a herringbone configuration. A frequently used and visually appealing configuration is a first border formed with a black-white-black wood purfling strip, an inner band of shell purfling, and a second border of black-white-black purfling strip, such that the shell purfling is sandwiched between the two wood purfling strips. It is to be appreciated that various materials may be utilized to simulate wood purfling, including not only wood, but wood fiber, plastic, and other materials. Further references to "wood purfling" should be understood to include simulated wood products.

The installation of shell purfling can be a time-consuming process. One of the limitations of the known shell purfling strips is that the strips are not flexible and cannot be bent in the same manner as the binding. The lack of flexibility is problematic when it is desired for the inlay to be curved, which is typically the case for purfling used on instruments. The purfling of a conventional acoustic guitar requires the inlay material to placed through or around many curves which have too tight of a radius for the shell strips to achieve without breaking. One known solution to this problem is to break the strips into very, very short individual pieces as it is being inlaid into the preformed channel, in a mosaic-like method. Once in the channel, even though each short piece is straight, the cumulative effect of utilizing the individual pieces is that the inlay strips follow the desired curve of the instrument or other work piece. However, this process is very time consuming and labor-intensive.

In another method, instead of breaking the inlay strips into small pieces, ABALAM blanks are milled by a computer numerically controlled ("CNC") milling machine, or other computer controlled machine, such that the inlay strips fit exactly into the preformed channel formed by the edge of the top and the inside edge of the binding. In other words, each piece of the inlay is precisely cut to fit into a particular segment of the channel. In this method, a smaller number of pre-cut inlay pieces (such as 7 to 15 pieces) are necessary for the shell purfling. However, there are disadvantages associated with this method as well. The machinery required for this method is expensive, and the programming and milling time for each shape can require substantial time. The inventory requirements for the inlay material can also be difficult for smaller manufacturers, because different instrument models and configurations utilize different shapes of inlay material.

This method also results in greater waste of shell material than the previously described method and the method disclosed herein.

Each of the processes described above is time consuming for another reason. Under the known methods, including the method disclosed herein, the channel for placement of the shell purfling and other purfling elements (including wood purfling) on a musical instrument is created by the edge of the binding on one side and the outside edge of the top. It should be understood that musical instruments may also include purfling on the bottom and sides of the instrument. Binding is also used at the joint of the sides of the instrument with the bottom. Therefore, references herein describing use of the disclosed purfling to ornament the top of an instrument should further be understood to also apply to the bottom and/or sides of the instrument. When the binding is glued along the sides of the instrument, strips of TEFLON (or other materials which will not be held by the glue such as polyethylene) are used as a temporary spacer for the space which will be occupied by the shell purfling, such that the wood purfling can be glued in place as the binding is installed. Once the glue has dried and adequately set up, the TEFLON strips are removed and the individual pieces of shell purfling are placed and glued into the channel. This process requires that the TEFLON be milled or cut to the size of the desired piece of shell purfling so the shell purfling will fit tightly into the portion of the channel vacated by the TEFLON.

SUMMARY OF THE INVENTION

The presently disclosed invention is a method of fabricating a flexible shell purfling strip which may be installed at the same time as the binding and other purfling elements. The flexible shell purfling strips have sufficient flexibility to be placed within a curved configuration in significantly longer pieces rather than a small piece at a time, thereby significantly reducing the amount of time required to install the shell purfling. The presently disclosed invention provides a method of manufacturing the flexible shell purfling strips. An embodiment of the disclosed invention utilizes shell blanks fashioned from abalone, oyster, or other organic shell materials, including ABALAM or other laminated shell blanks or materials.

Flexible shell purfling strips manufactured according to the present method are flexible along the long axis of the strip thereby allowing the shell purfling strips to be placed, as a single unit, in curved channels in both the top of an instrument which requires the strips to bend with respect to the longitudinal axis. The strips are also flexible with respect to the transverse axis which allows the shell purfling strips to be placed, as a single unit, in channels in the side of an instrument which follow the curves of the waist of the instrument. This flexibility is created by creating a laminated structure which comprises a layer of binding material which is overlain by a layer of organic shell matter, where a bonding agent adheres the two layers together. The organic shell layer comprises a plurality of breaks along the length of the strip. The binding material retains the individual fragments of the shell layer in a strip configuration, but because the binding material comprises a flexible material, such as rubber, the layer of binding material is sufficiently flexible to allow the purfling strip to flex longitudinally and transversely.

The flexible strips may be installed in any work piece where it is desirable to form curved sections of shell inlay on the work piece. Because the purfling strips may be installed as a unit as opposed to small segments of shell material, installation of the inlay strip is done much faster than the known shell purfling strips. A plurality of shell purfling strips may be attached, in an end-to-end configuration, to the side of a wood purfling strip, such that an entire unit of shell purfling/wood purfling may be installed in a preformed channel in a single step. Because the shell purfling strips are about as flexible as TEFLON strips, the shell purfling strips can be installed simultaneously with the binding, eliminating the need for installing and removing the TEFLON.

The flexible shell purfling strips are manufactured by milling a shell blank, such as ABALAM, into a plurality of strips. The strips are typically cut with the shell blank mounted to a rigid substrate with a water soluble adhesive, with the top side of the shell blank glued to the rigid substrate. The shell blank is cut into a plurality of parallel strips, but the cutting machinery is set such that the rigid substrate is not cut through. Once the strips have been cut, the strips are removed from the substrate by dissolving the water soluble adhesive.

In one embodiment of the manufacturing method, the individual strips are thereafter remounted in parallel configuration, with sides of the strips abutting the sides of the adjacent strips, to a second rigid substrate. A layer of binding material is thereafter attached to the bottom side of the strips with a bonding agent. Once the bonding agent has sufficiently dried and cured, the assembly comprising the substrate, the shell strips, and the layer of binding material is placed again into the cutting machinery, such that angle of the new cuts will be at approximately ninety degrees from the angle of the first cuts. Once again, the cutting machinery is set such that the rigid substrate is not cut through, but the shell strips and binding material are cut into "strips" which are at approximately ninety degrees from the strips made by the previous cutting step. Once the new strips have been cut, the strips are removed from the second rigid substrate by dissolving the water soluble adhesive. Each resulting shell purfling strip comprises a plurality of individual segments of shell material in an end-to-end configuration, with the individual segments held together as a strip by the binding material. When a shell purfling strip is placed within the preformed channel and glued therein, the side of the strip having the binding material is placed facing the bottom of the channel, with the layer of shell material facing upward.

The flexible shell purfling strips may also be attached along one side to a parallel and side abutting wood purfling strip, wherein the wood purfling strip comprises adhesive on the side abutting the shell purfling strip. Wood purfling strips typically come in lengths of thirty-two inches. If the shell purfling strips are manufactured from ABALAM or similar blank material, the shell blanks typically come in sheets 2³⁄₁₆ inches by 4⅝ inches, such that the shell purfling strips will typically be shorter than the wood purfling strips. Because of the different lengths, a plurality of shell purfling strips may be placed in an end-to-end configuration and consecutively attached to the side of a fiber purfling strip, resulting in a single purfling strip of parallel shell and wood elements which is long enough to extend around the outside border of one half of a standard sized instrument. The combined shell/wood purfling strips may be installed in minutes, thus allowing the completion of an instrument in substantially less time than the known methods.

BRIEF DESCRIPTION OF THE DRAWINGS

FIG. 14 shows the structure of FIG. 13 after the polyurethane and underlying strips of organic shell have been cut along the width of the structure, where the support member is not cut all of the way through.

DETAILED DESCRIPTION OF THE EMBODIMENTS

Current Practice for Installing Shell Purfling

Figure 1:
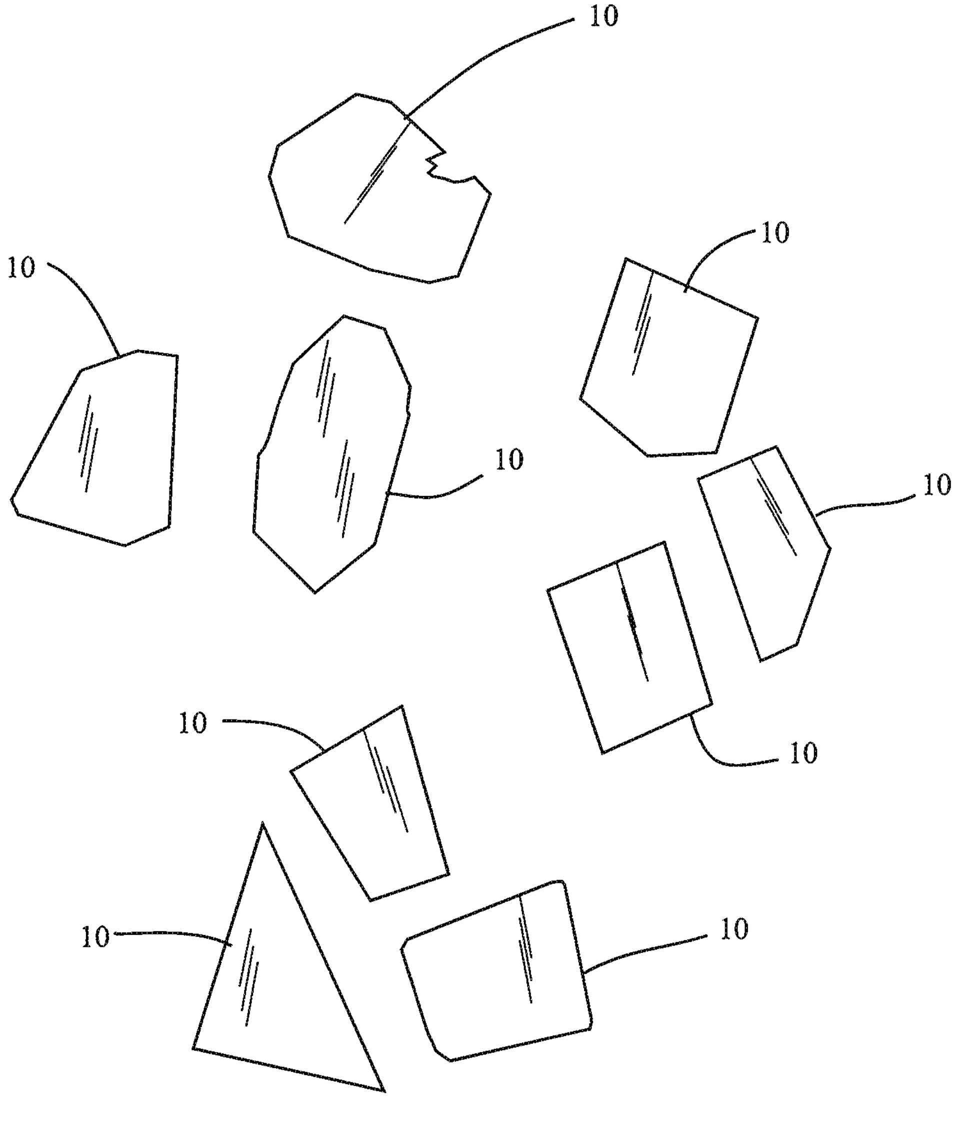
FIG. 1 shows pieces of abalone or mother-of-pearl blanks as cut from the shell.
Figure 2:
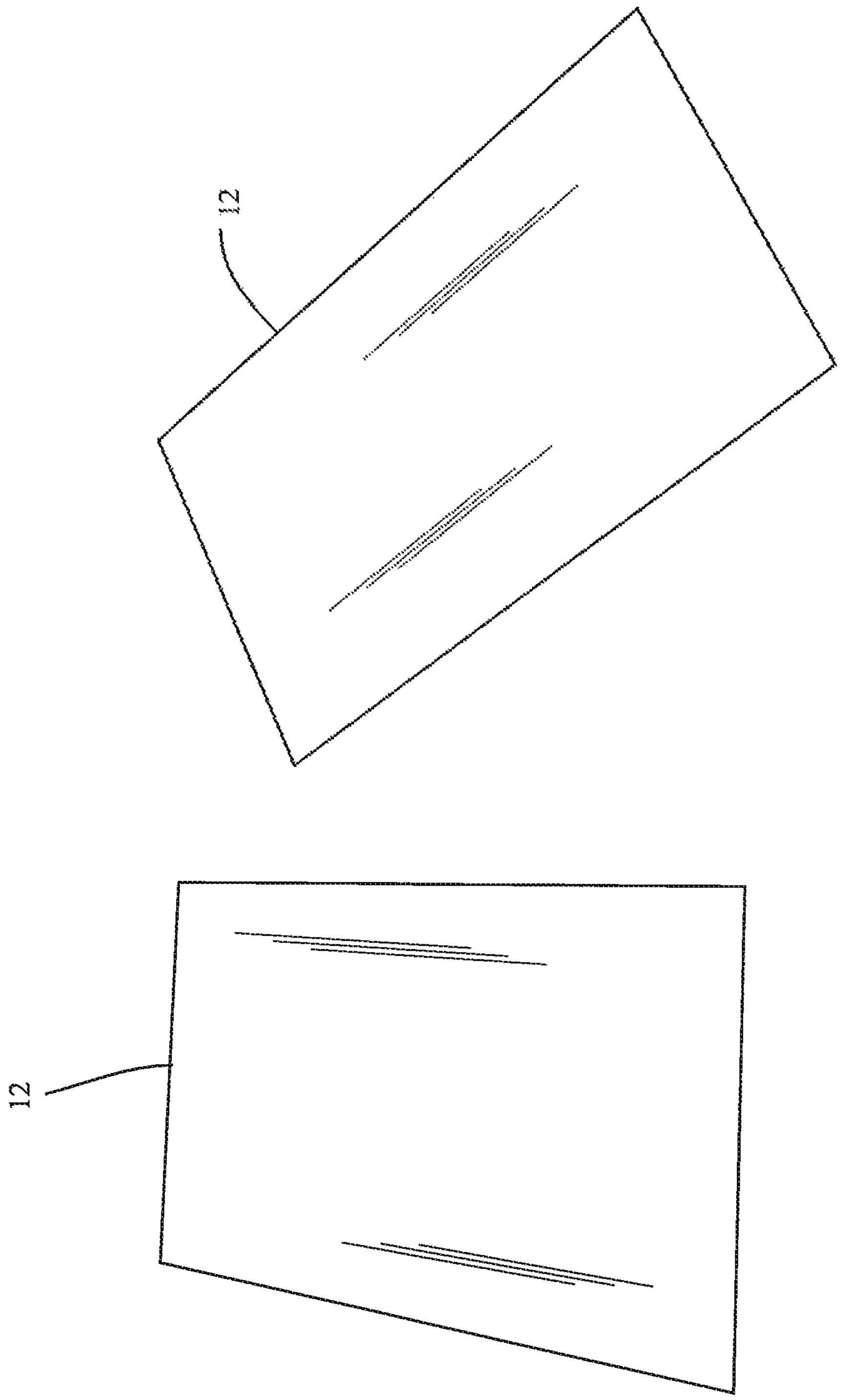
FIG. 2 shows rectangular sheets of flat organic shell blanks.
Figure 3:
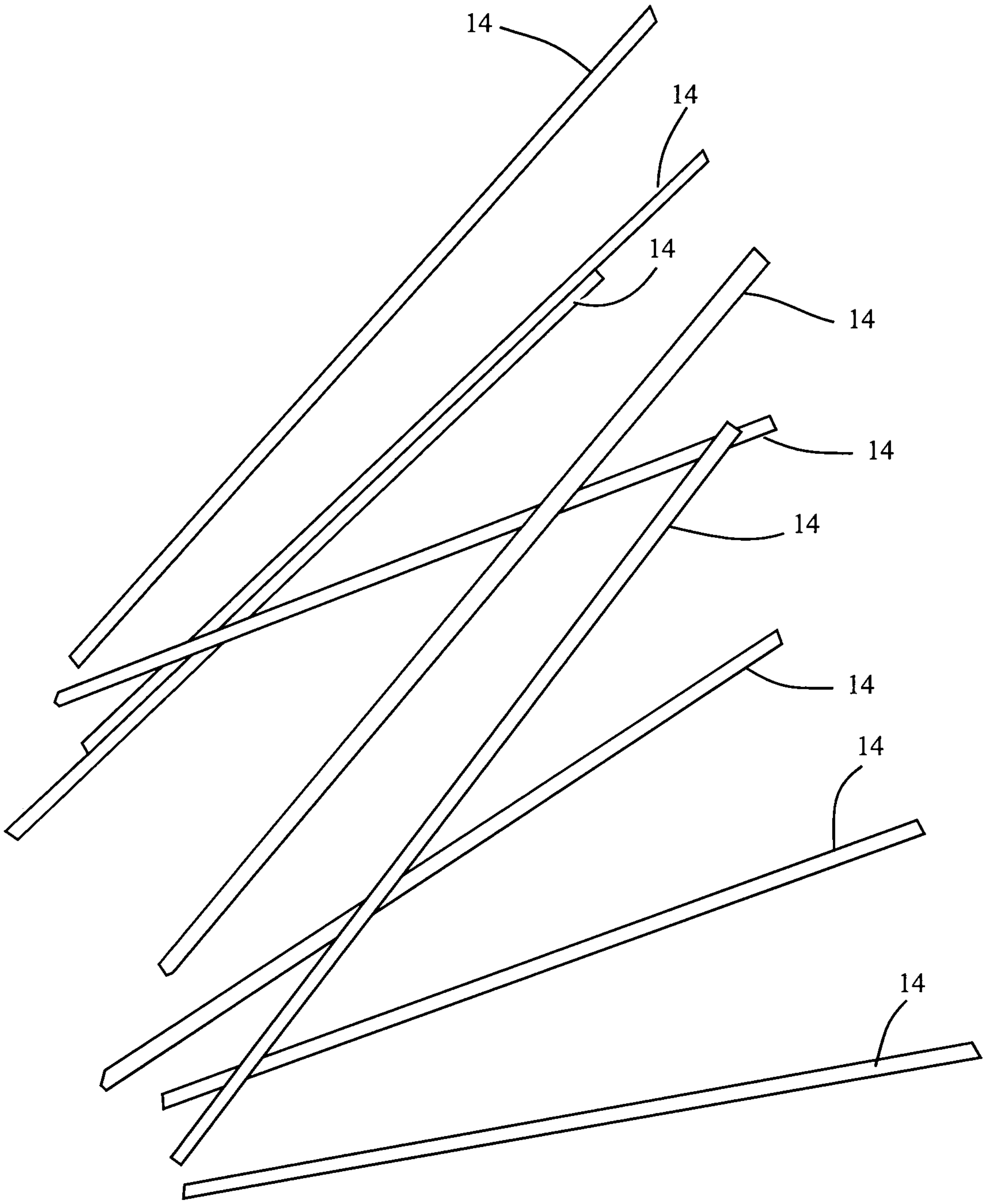
FIG. 3 shows strips of organic inlay material after cutting the shell blanks shown in FIG. 2.
Figure 4:
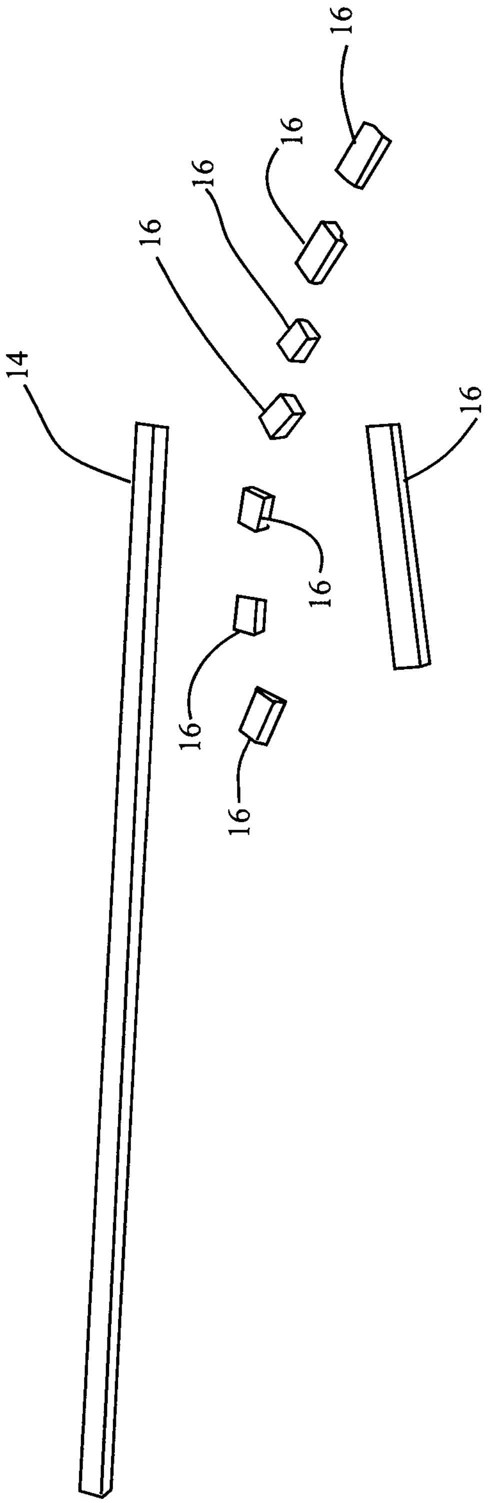
FIG. 4 shows how the strips of FIG. 3 are segmented into small pieces for insertion into a workpiece according to the presently practiced method.
Figure 5:
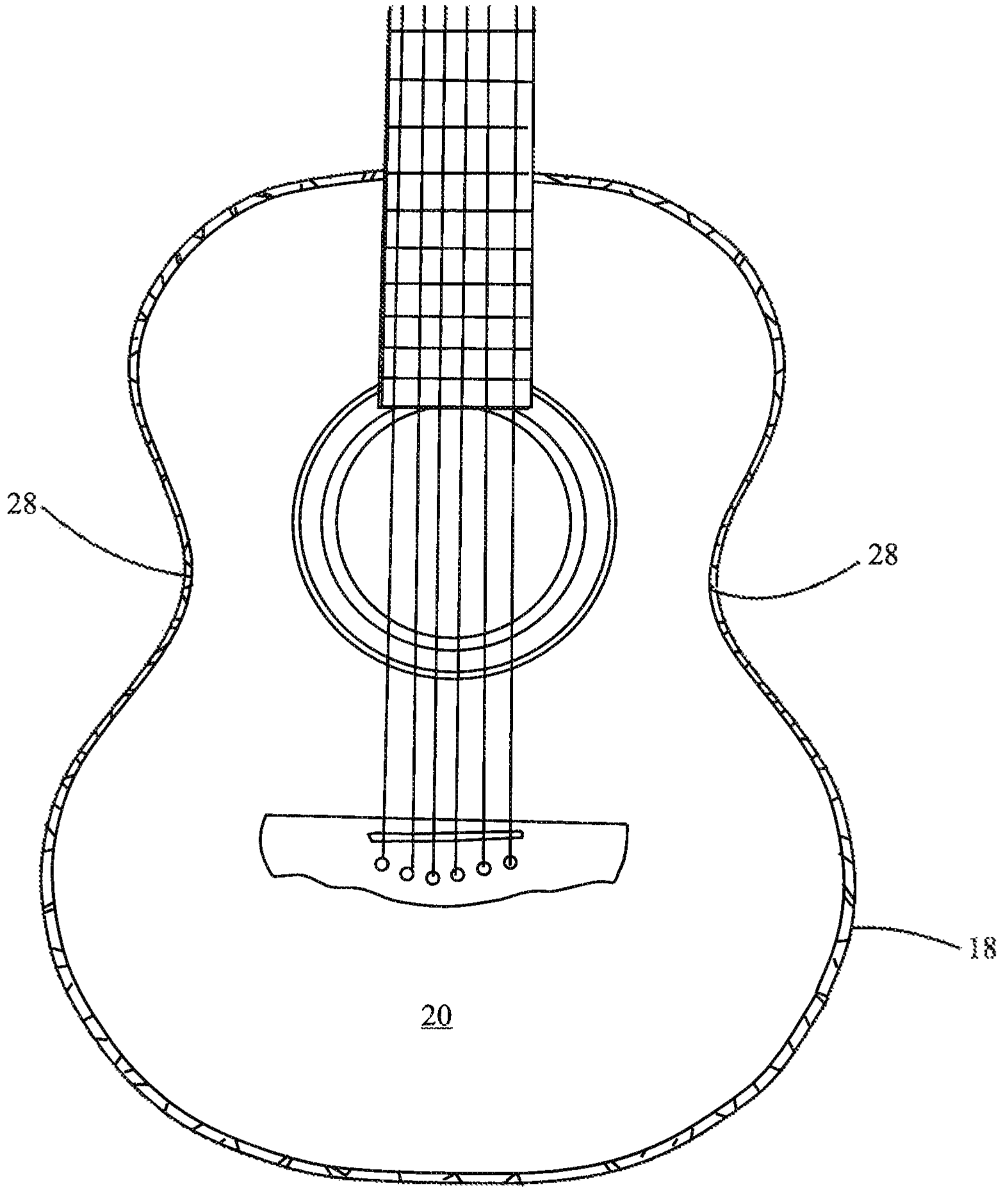
FIG. 5 shows a musical instrument having shell purfling bounding the outer edge of the soundboard of the instrument.
Figure 6:
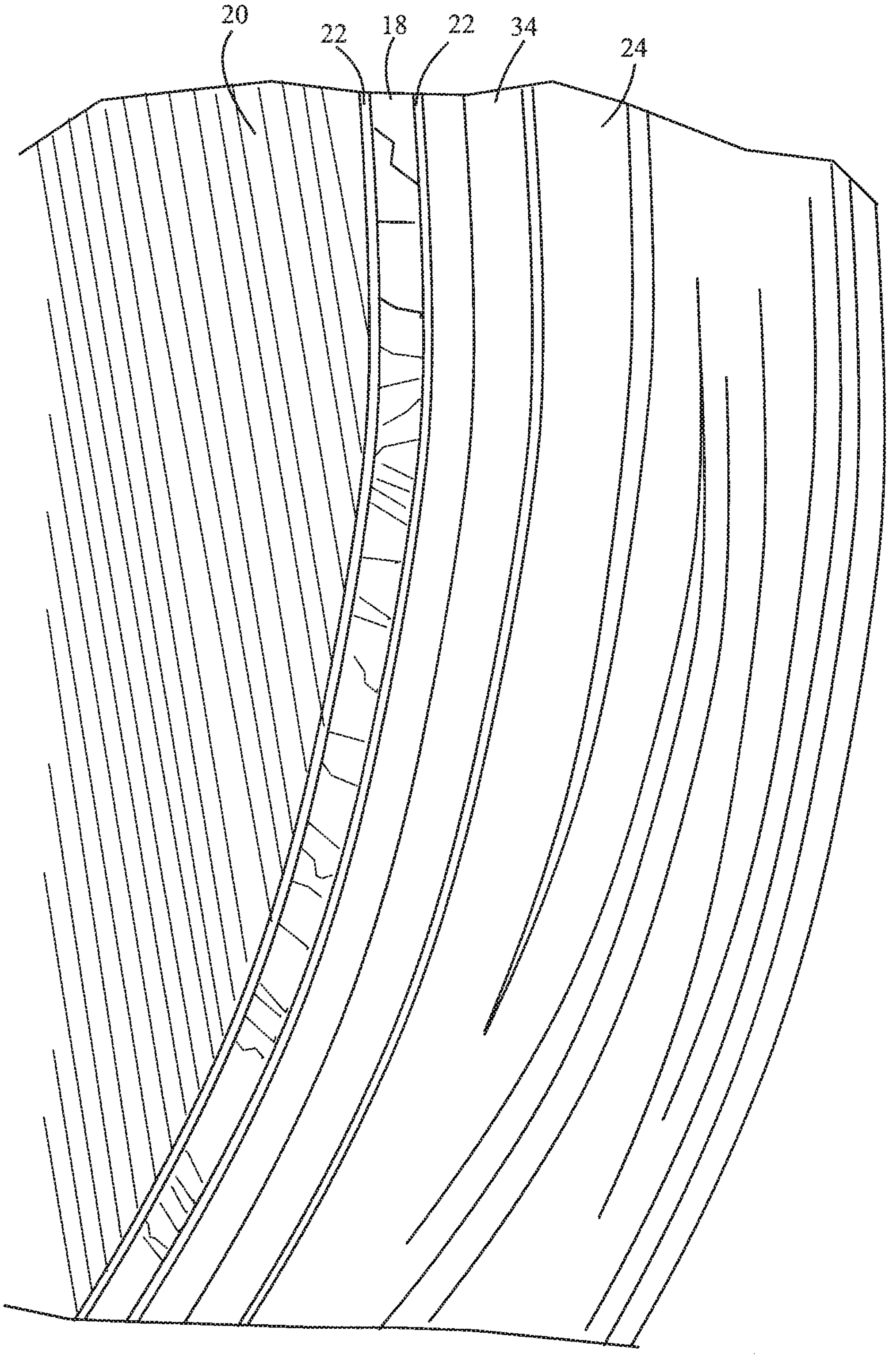
FIG. 6 shows a close-up view of the shell purfling of FIG. 5, showing how the shell purfling may be bounded on either side by wood purfling material.

Referring now to the figures, FIG. 1 shows examples of the shapes of blanks 10 which might be obtained directly from an organic shell. Because the blanks 10 are obtained directly from the shell, the size and shape of the blanks are limited by the size and geometry of the shell. FIG. 2 shows examples of organic shell inlay blanks 12 which have been processed into a sheet configuration. For example, such shell inlay blanks may be manufactured according to U.S. Pat. No. 5,776,581 (Sifel et al) to form a shell blank known as ABALAM. When ABALAM or similar shell blanks 12 are utilized for shell purfling, the sheets are typically cut into long strips 14 as shown in FIG. 3. In order to be used to form purfling having curving features, the long strips 14 are typically cut into shorter pieces 16 as illustrated in FIG. 4. Utilizing these shorter pieces 16, an ornamental border 18 may be placed around the perimeter of the face 20 of a musical instrument, such as a guitar 22 shown in FIG. 5. FIG. 6 shows a close up view of an ornamental border 18 formed with the shorter pieces 16 of shell purfling.

As shown in FIG. 6, the ornamental border 18 formed by the shell purfling may be bordered on each side by wood purfling strips 22. The wood purfling strips 22 are typically available in lengths of thirty-two inches. Because of the relatively small width of the wood purfling strips 22 and the flexibility of the materials used for the fabrication of the strips, the wood purfling strips are usually flexible enough to be installed around curves of an instrument without performing the wood purfling strips or cutting the strips into smaller segments as required for installation of shell purfling according to the prior art.

Figure 7:
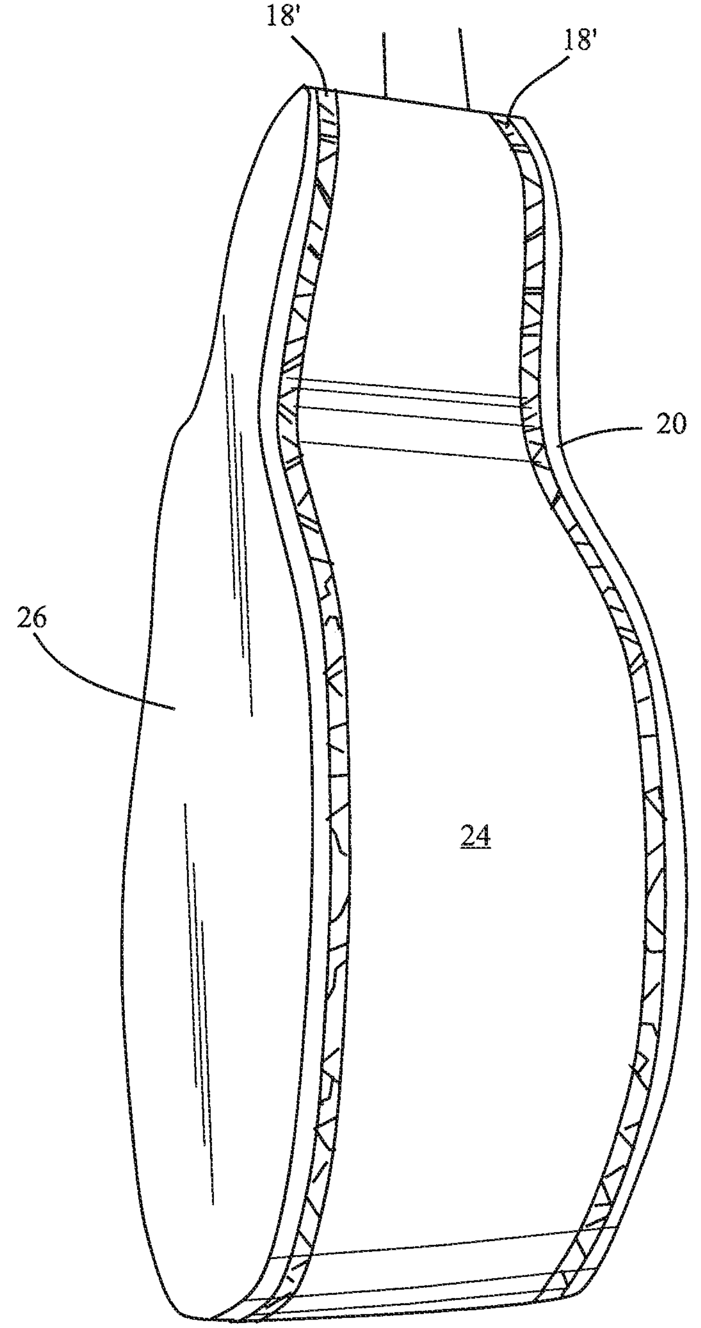
FIG. 7 shows how shell purfling may also be utilized to ornament the side walls of a musical instrument.

Aside from the top 20 of a musical instrument, other portions of a musical instrument may be ornamented with shell purfling. As shown in FIG. 7, the sides 24 of a musical instrument may be ornamented with ornamental border 18' which is adjacent to the top 20 and the back 26 of the instrument. As can be seen by comparing FIGS. 5-6 with FIG. 7, when ornamental border 18' comprising shell purfling is placed around the sides 24 of a musical instrument, the curves which must be negotiated by the purfling change. Assuming the top 20 of the instrument may be defined by a single plane, the curve of the ornamental border 18 requires flexibility of the shell purfling segments in two dimensions, where the top surface, or show face 30 of the shell purfling remains in the same plane as the top of the instrument. For purposes of this specification, this flexibility, where the show face 30 of the shell purfling remains in a single plane, is referred to herein as longitudinal flexibility. However, the sides 24 of an instrument typically are not defined by a single plane, because the instrument will usually have some form of waist 28. As shown in FIG. 7, when an ornamental border 18' of shell purfling is placed about the sides 24 of an instrument, the show face 30 of the shell purfling follows the shape of the sides, such that the show face cannot be defined by a single plane. Therefore, a shell purfling strip would have to be flexible about its show face 30 for a single strip to be utilized as a significant portion of the side purfling. This flexibility is referred to herein as transverse flexibility. While wood purfling strips typically have both longitudinal flexibility and transverse flexibility, the known shell purfling strips have neither, thus requiring the strips to be cut into shorter pieces 16 as indicated in FIG. 4.

Figure 8:
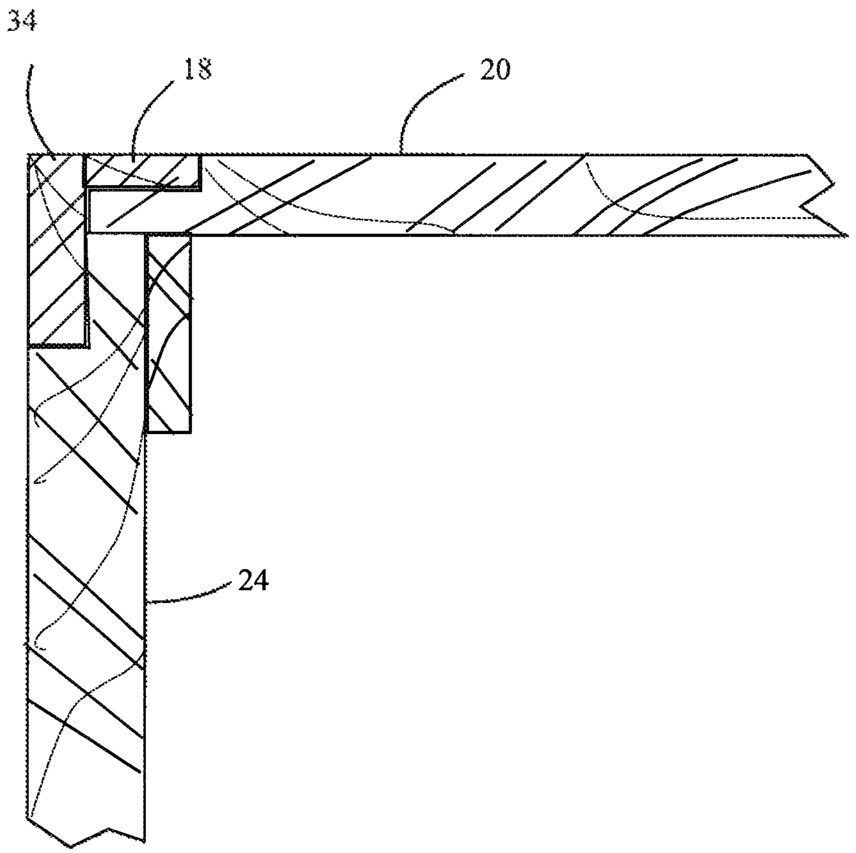
FIG. 8 schematically shows how the channel for the purfling is formed between the binding and the top of an instrument.

When inlay materials are placed within a work piece, the materials are set within a depression or channel. FIG. 8 shows schematically how a channel 32 for placement of purfling 18 is typically preformed in the top of a musical instrument. The top 20 and sides 24 of the instrument are first routed to form a seat for the binding 34 to partially form channel 32. Binding 34 is thereafter seated at the outermost corner of the instrument, thereby forming the outer wall of channel 32, where the inner wall is formed by the edge of top 20. Channels may similarly be formed between the edge of the binding 34 and the sides 24 of an instrument, or the back 26 of an instrument, such that ornamental borders of shell purfling may be placed in the sides and/or back of the instrument.

The Present Invention

Figure 9:
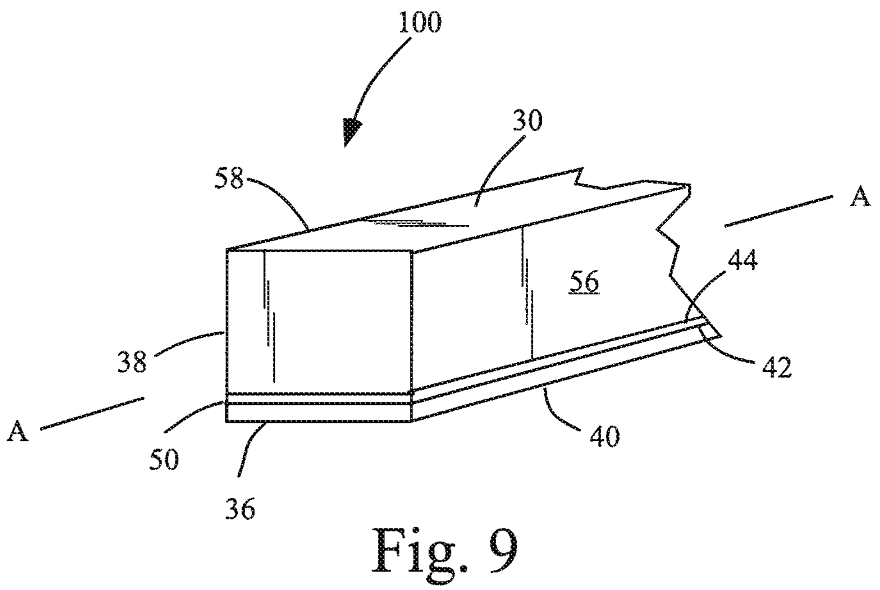
FIG. 9 shows a schematic view of the end of an embodiment of a shell purfling strip manufactured according to the disclosed method.

The shell purfling strips 100 manufactured according to the present method have both longitudinal flexibility and transverse flexibility, which allows the strips to be installed in full length strips in the preformed channels of a work piece as opposed to being cut into shorter pieces 16 according to the current practice. As shown in FIG. 9, the shell purfling strips 100 of the present method comprise a laminated structure. This laminated structure comprises a first layer 36 of binding material and a second layer 38 of organic shell matter, which might comprise either shell blanks 10 as shown in FIG. 1, or strips 14 cut from a sheet 12 of manufactured shell laminate, such as ABALAM. The binding material used for first layer 36 has both longitudinal and transverse flexibility. Among the acceptable binding materials are polyurethane and acetate. First layer 36 has a first length and second layer 38 has a second length, wherein the first length and second length will usually be equivalent. First layer 36 has a a channel-facing surface 40, which is the surface which comes into contact with the bottom surface of channel 32. First layer 36 further comprises a shell-facing surface 42 which is the surface which abuts second layer 38. A first thickness is defined between the channel-facing surface 40 and the shell facing surface 42. This first thickness is generally 0.010 inches, depending upon the binding material and its properties. Second layer 38 has an exposed surface previously identified as show face 30. Second layer 38 also comprises a binding-material facing surface 44. A second thickness is defined between the exposed surface and the binding-material facing surface. This second thickness will be the thickness of the organic shell matter which, if ABALAM or a similar product is utilized, will be approximately 0.050 inches. Second layer 38 comprises a plurality of breaks 46 interposed along its length, referred to above as the second length.

A bonding agent 50 is disposed between the shell-facing surface 42 of the first layer 36 and the binding-material facing surface 44 of the second layer 38. The bonding agent 50 attaches the first layer 36 to the second layer 38. Various bonding agents may be utilized, including high performance adhesive transfer tape manufactured by 3M, including model number 467 MP or transfer tapes utilizing 3M 300LSE adhesive.

Breaks 46 typically, but not necessarily, extend completely through second layer 38, thereby forming individual segments 48 which are bound together with first layer 36 of binding material. The individual segments 48 may each comprise a rectangular solid segment, where the second layer comprises a plurality of rectangular solid segments. Breaks 46 may be made to the individual strips by machining or impact means. Breaks 46 may also be made according to the method described below.

A method for creating the shell purfling strips 100 from sheets 12 of shell blank material, such as ABALAM, comprises the following steps. Using hide glue, a sheet of shell blank 12 is glued face down to a sheet of rigid substrate material 52, such as Masonite or similar material, typically having dimensions of W×L. The glued assembly is thereafter cut into strips 14, but not cutting all of the way through the rigid substrate 52. Typically this process is done by a computer numerically controlled ("CNC") milling machine, which may have means for holding the work-piece (i.e, the glued assembly) in place by means of a vacuum seal on the bed of the CNC mill. The CNC milling maching is employed with depth control to cut the work piece such that the shell blank sheet 12 is cut into strips 14 but the rigid substrate 52 is not cut all of the way through.

In a first embodiment of the method, a thin sheet (approximately 0.010" thick) of binding material, such as acetate or polyurethane, is affixed to the back side of the sheet 12 of shell blank material (because the sheet was originally glued face-down on the rigid substrate), thereby creating a layered configuration comprising, from bottom to top, the rigid substrate 52, the shell layer (second layer 38) and the binding material layer (first layer 36) At this point, the strips of the shell blank have been milled into the proper width (generally 0.050") but the strips remain glued to the rigid substrate 52. The inventor herein has found that acetate or polyurethane are the preferred backing materials because each possesses several critical properties: both are flexible enough to bend but stiff enough to retain a linear path, both are impervious to the water bath required for removal of the shell blank strips from the rigid substrate 52, and each material holds fasts to the shell blank with the adhesives. As stated above, the inventor herein has determined that the preferred adhesives for attaching the binding material to the strips of shell blank include 467 MP or 300LSE hi-performance adhesives, manufactured by 3M Corporation, or adhesives having similar properties.

In a first embodiment of the manufacturing method, after the binding material is attached to the backs of the separated milled strips, the layered assembly, which comprises rigid substrate 52, the shell layer (second layer 38) and the binding material layer (first layer 36), is precisely located in a laser cutter. The laser cutter cuts around the perimeter of each individual strip 14 of shell material cutting clear through the binding material layer such that each strip is overlain by a separated layer of binding material, which has been separated from the binding material covering adjacent strips. After the laser cutting, the layered assembly is placed in a hot water bath to release the strips from the rigid substrate 52, resulting in individual laminated strips comprising first layer 36 and second layer 38. Because of the previously described laser cutting step, the first layer 36 of binding material is the exact same width and length as the individual strip 14 of shell blank as shown schematically in FIG. 9.

Figure 10:
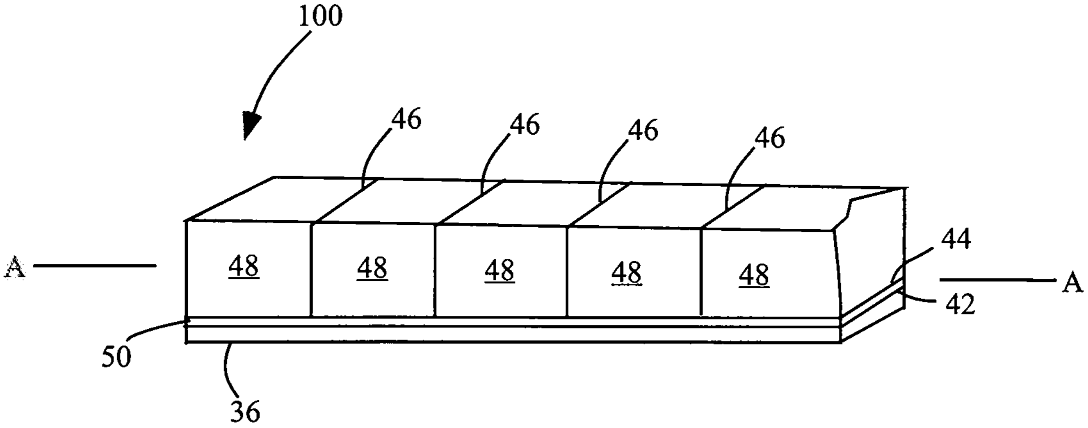
FIG. 10 shows a schematic view of the side of an embodiment of a shell purfling strip manufactured according to the disclosed method.

The next step in this embodiment of the method is to break or cut the second layer 38 of organic shell matter into small individual segments 48 or pieces, but leaving the first layer 36 of binding material intact, resulting in shell purfling strips 100. FIG. 10 schematically shows the general orientation of the breaks 46 in a shell purfling strip. The means for breaking the strips into individual segments 48 or pieces may be accomplished by employing a CNC mill. If a CNC mill is used for making the breaks 46, the flexibility of the shell purfling strips 100 may be controlled by adjusting the number of breaks by programming less or more breaks into the CNC mill as desired.

Because the shell purfling strips 100 have the thin first layer 36 of binding material, the strip retains its integrity. Each individual segment 48 directly abuts an adjacent segment such that the individual breaks are not visually noticeable, particularly because of the patterned appearance of the show face 30 of the organic shell material. The resulting shell purfling strip 100 has both longitudinal and transverse flexibility such that it can be inlaid alone around the sides or edges of a channel 32 or inlaid simultaneously with the bindings and marquetry of an instrument. The shell purfling strips 100 can be glued and otherwise attached by all the traditional methods and means used in the instrument making industry. The shell purfling strips 100 made with this method may also be in other industries and arts where decorative shell trim is used (for instance, hi-end surfboards, jewelry boxes, humidors, casework, etc.).

Figure 11:
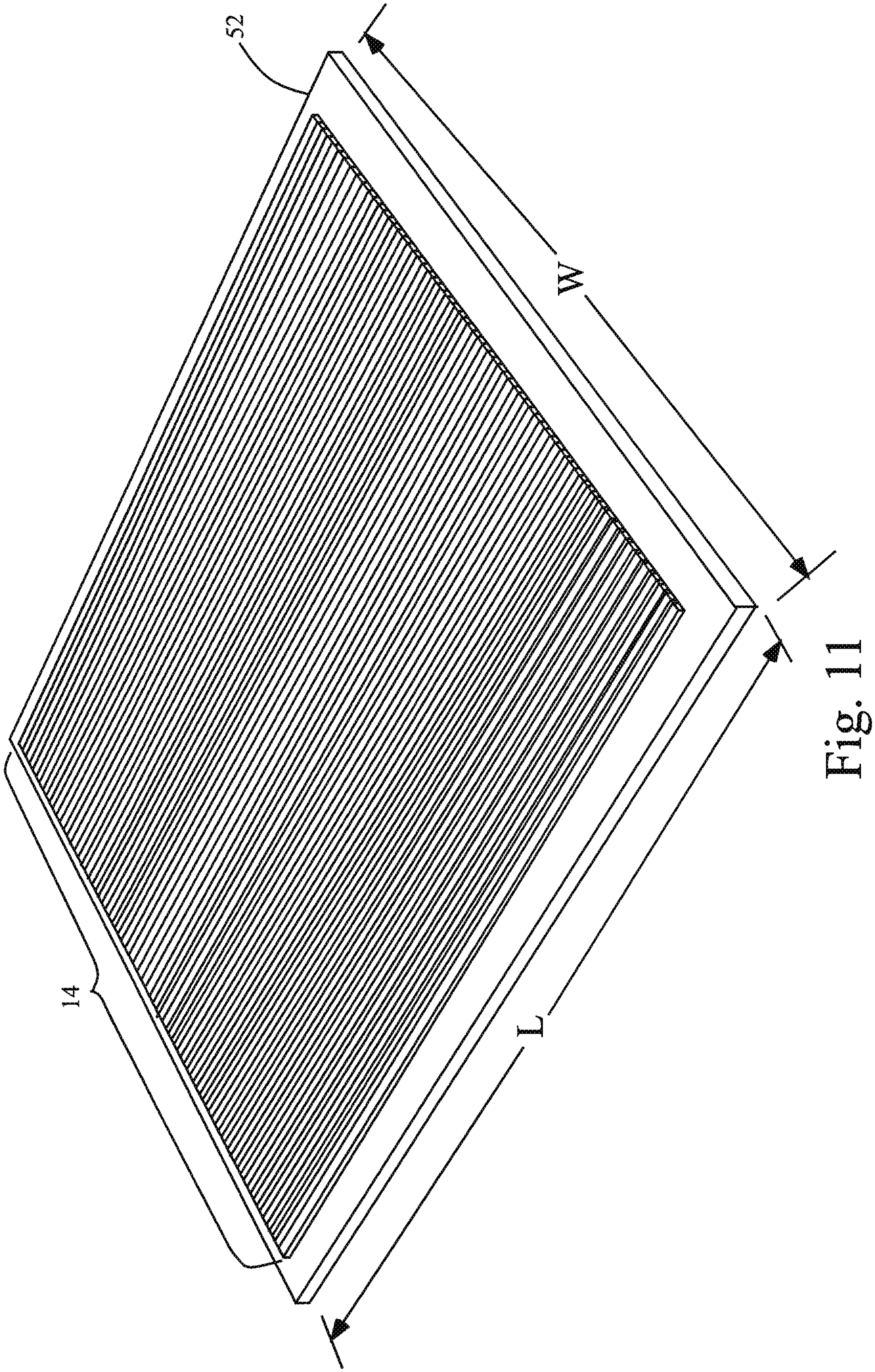
FIG. 11 shows a rectangular sheet of flat shell blank glued to a rigid substrate, after the blank has been cut into strips along the length of the shell blank.
Figure 12:
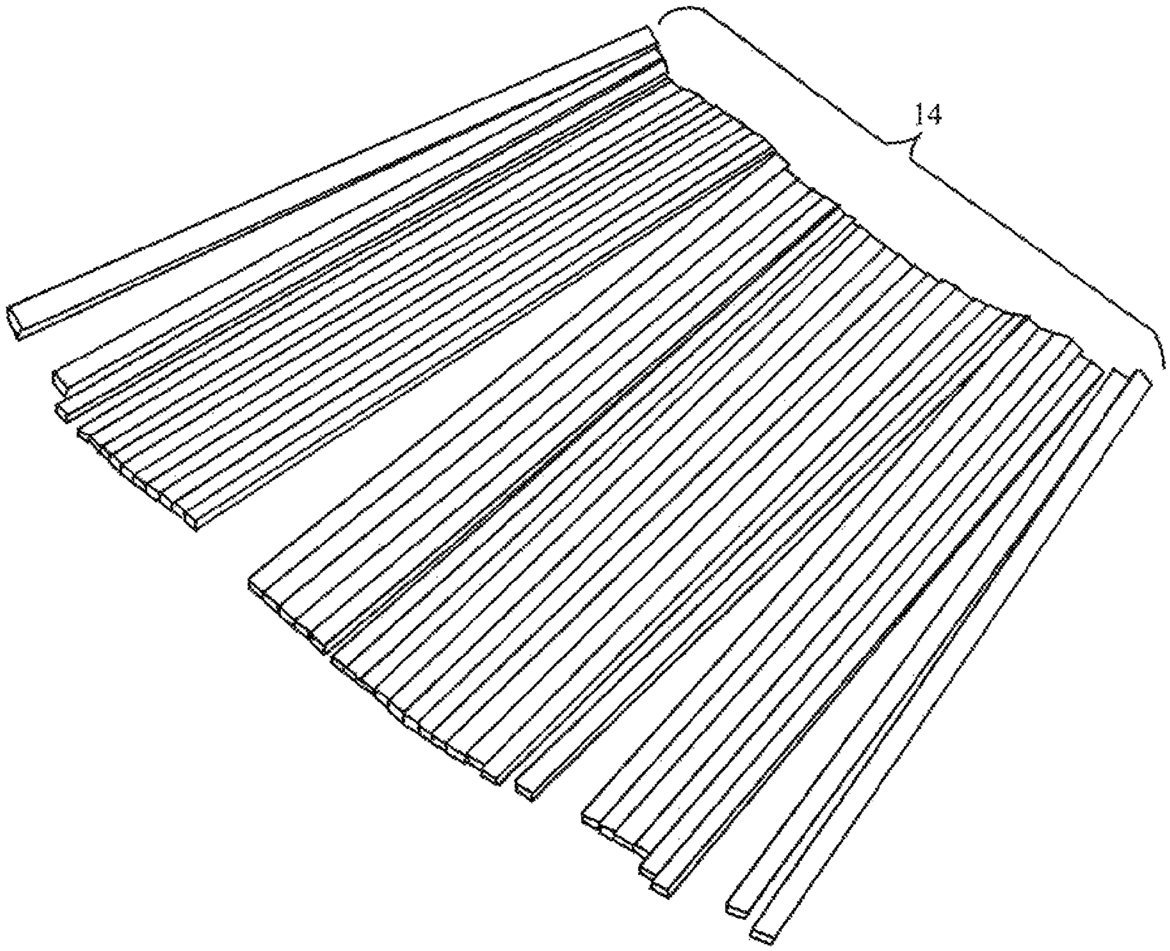
FIG. 12 shows the strips of organic shell of FIG. 11 after the strips have been removed from the rigid substrate.
Figure 13:
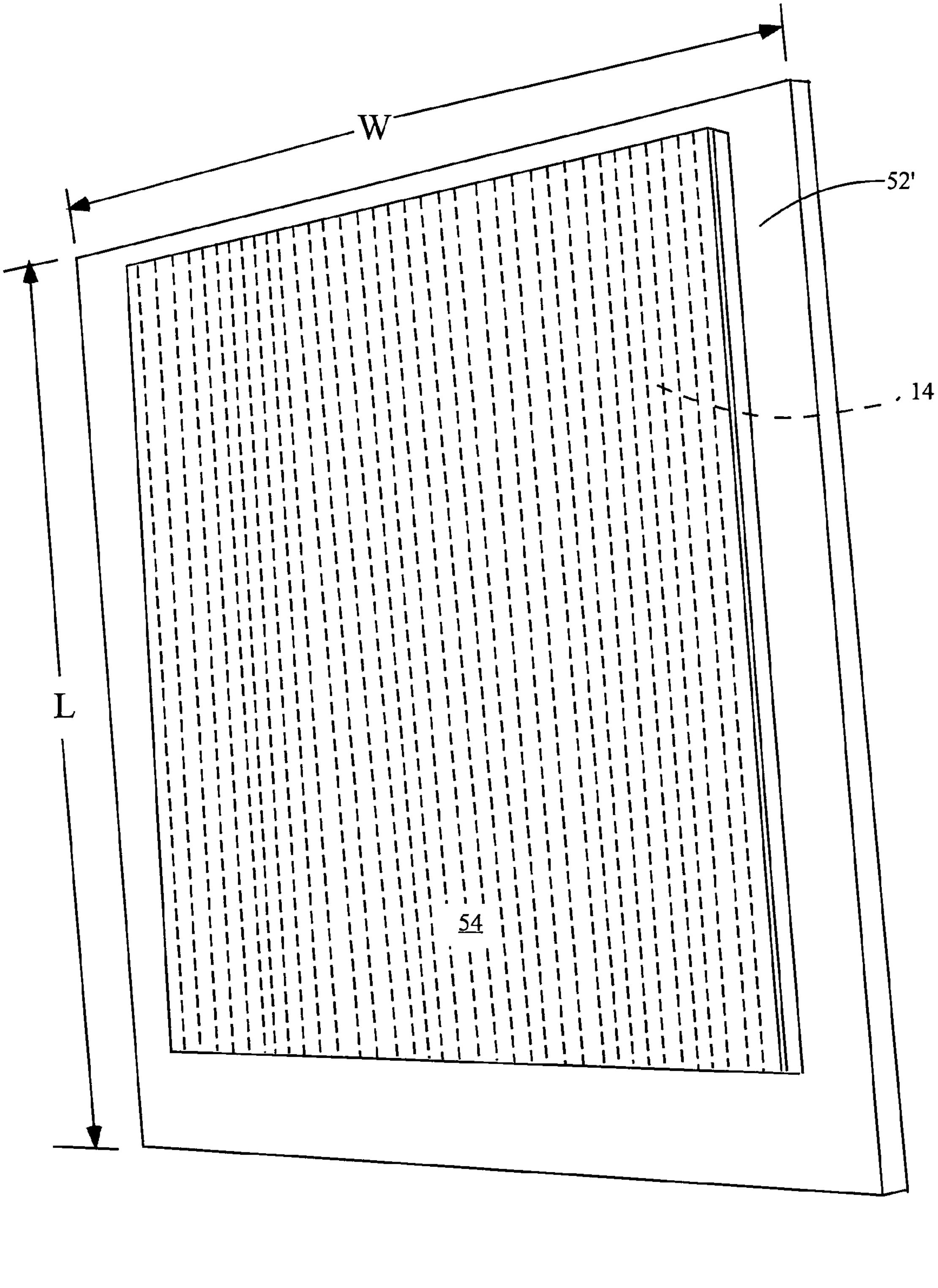
FIG. 13 shows the strips of FIG. 12 remounted to a rigid substrate and having a sheet of binding material, such as polyurethane, affixed to the top surface of the shell strips.

In a second embodiment of the manufacturing method, as in the embodiment disclosed above, a sheet 12 of shell blank material is glued exposed face down with hide glue to a rigid substrate 52 such as a sheet of Masonite or similar material, typically having dimensions of W×L. As illustrated in FIG. 11, the glued assembly is thereafter cut into strips 14, but not cutting all of the way through the rigid substrate 52. After being cut, strips 14 are removed from the rigid substrate 52 by dissolving the water soluble adhesive. The strips 14 are thereafter mounted to a second rigid substrate 52' with a water soluble adhesive, such that the strips are arranged in parallel with one another, the parallel strips defining a long axis oriented along length L of the rigid substrate 52'. The sides of adjacent strips 14 are mounted such that adjacent strips abut one another in direct contact. When first mounted to second rigid substrate 52', the parallel strips each comprise a front side (show side 30) attached to the second rigid substrate and an exposed back side. A panel 54 of binding material, such as acetate or polyurethane, is attached to the exposed back sides of the adjacent strips 14, as shown in FIG. 13, utilizing a bonding agent such as 467 MP or 300LSE hi-performance adhesives, manufactured by 3M Corporation, or adhesives having similar properties.

Figure 14:
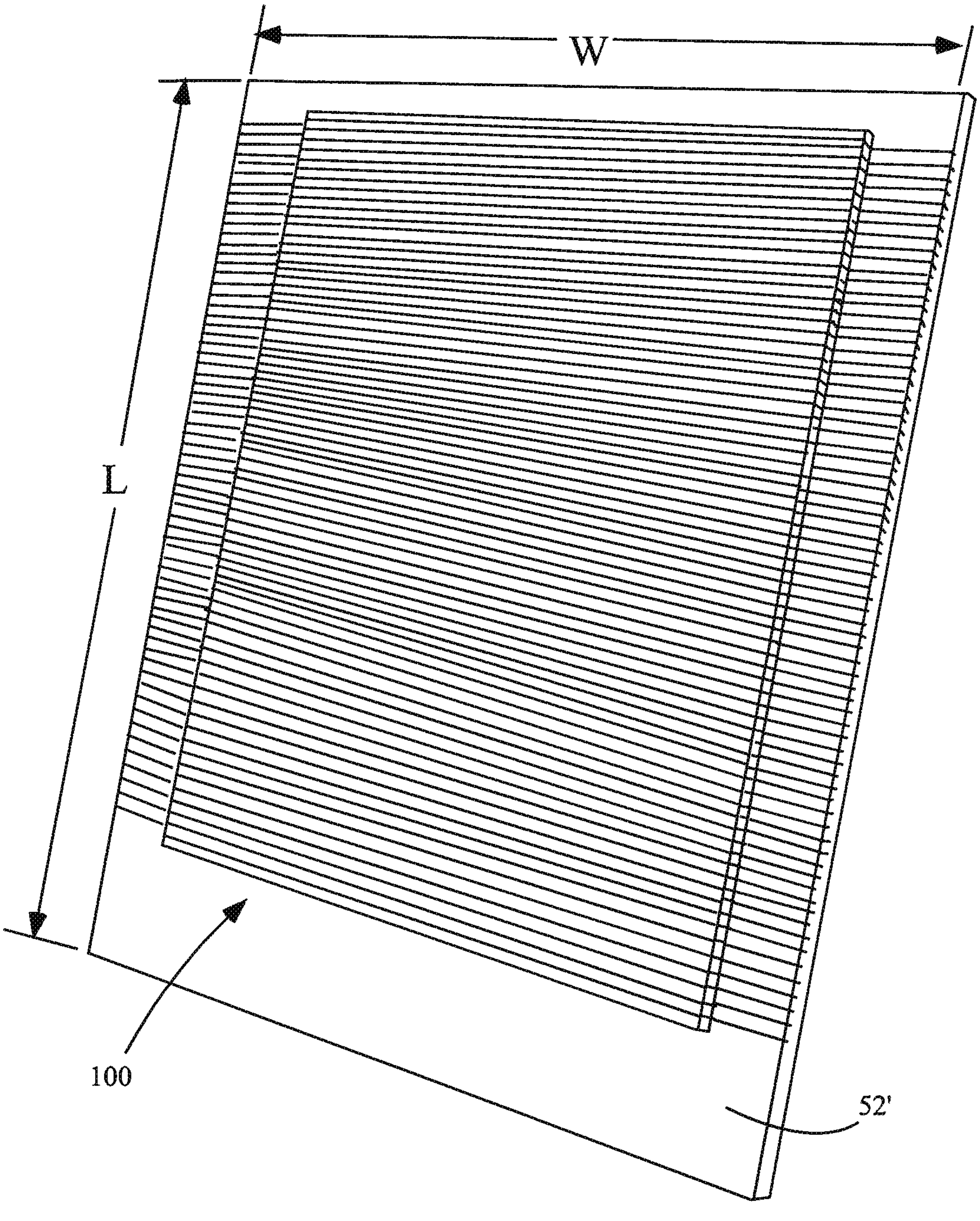

Once the bonding agent attaching panel 54 to the exposed back sides of adjacent strips 14 has sufficiently set, the layered assembly of rigid substrate 52', the attached strips 14 (second layer 38) and the binding material layer (first layer 36) are placed in a cutting apparatus. The cutting apparatus cuts panel 54 of binding material and the underlying strips 14 of organic shell matter at ninety degrees to the long axis, but does not cut through rigid substrate '52. As shown in FIG. 14, the resulting cuts are oriented along the width of the rigid substrate 52'. This cutting results in a plurality of shell purfling strips 100, each strip having a laminated structure such as that shown in FIG. 10, the laminated structure comprising a first layer 36 of binding material and a second layer 38 comprising a plurality of segments 48 of organic shell matter. As further shown in FIG. 10, a longitudinal axis A may be defined by the length of the shell purfling strip. Each strip comprises a first side 56 and a second side 58, where the first side 56 defines a first plane and the second side 58 defines a second plane, and the first plane and the second plane are each parallel to the longitudinal axis A. The shell purfling strips are removed from the rigid substrate 52' by dissolving the water soluble adhesive, resulting in a plurality of separated shell purfling strips 100.

It is to be appreciated that the reason the strips 14 are mounted to a second rigid substrate 52' is that when the strips are originally cut when mounted on the first rigid substrate 52, the strips are separated by the width of the saw cut. If the strips, while still mounted on the first rigid substrate 52, were immediately cut again at an angle of ninety degrees to the first cut, the gap between the plurality of segments 48 would be too large, being visually discernible. By removing the strips 14 from the first rigid substrate 52, and remounting the strips to the second rigid substrate 52', the strips are repositioned such that the strips are in contact with one another, thereby removing the space created by the first saw cut.

As discussed above, wood purfling strips 22 typically comes in lengths of thirty-two inches. As shown in FIG. 6, the ornamental border 18 formed by the shell purfling may be bordered on each side by wood purfling 22 or other types of marquetry. Because the shell purfling strips 100 of the present invention have sufficient flexibility to be mounted at the same time as the wood purfling strips 22, the installation of the shell purfling strips may be facilitated by pre-attaching a plurality of shell purling strips, in an end-to-end configuration, to the side of a wood purfling strip. This step results in a single perfling unit thirty-two inches in length, where the wood purfling strip acts as a reinforcement member for the plurality of shell perfling strips 100. Therefore, an embodiment of the present invention comprises preattaching shell purfling strips 100 to a reinforcement member such as wood purfling strips 22. The wood purfling strips are available with adhesive along the side, such that the shell purfing strips 100 may be attached in parallel length wise attachment to the wood purfling strips, with a side 56 of the shell perfling strip in lengthwise attachment to a side of the wood purfling strip.

Figure 15:
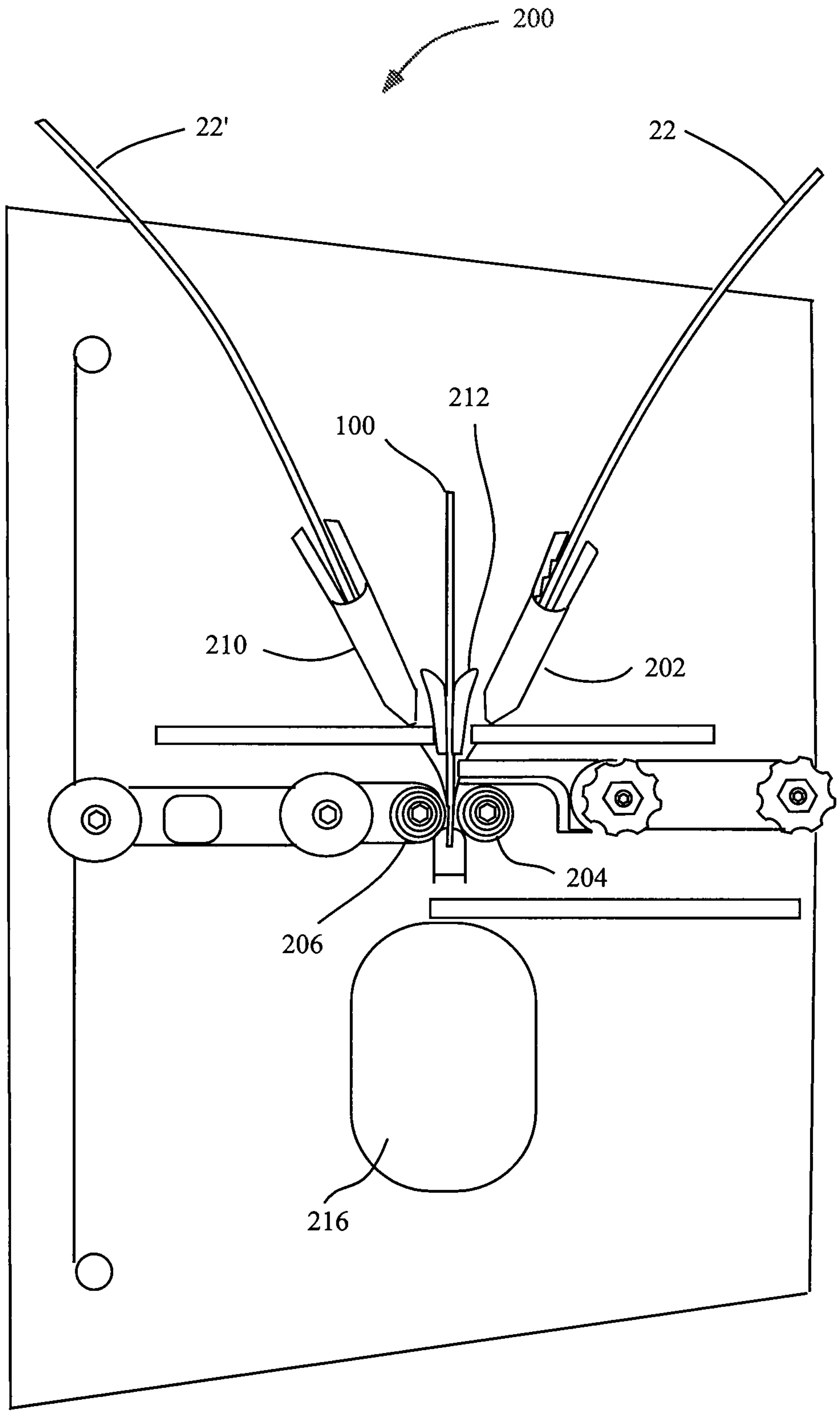
FIG. 15 shows a jig assembly which might be utilized to attach, in lengthwise arrangement, a plurality of strips of shell purfling to the side of a first strip of wood purfling, where a second strip of wood purfling is utilized on the opposite side of the organic shell strip to prevent crushing of the organic shell material.
Figure 16:
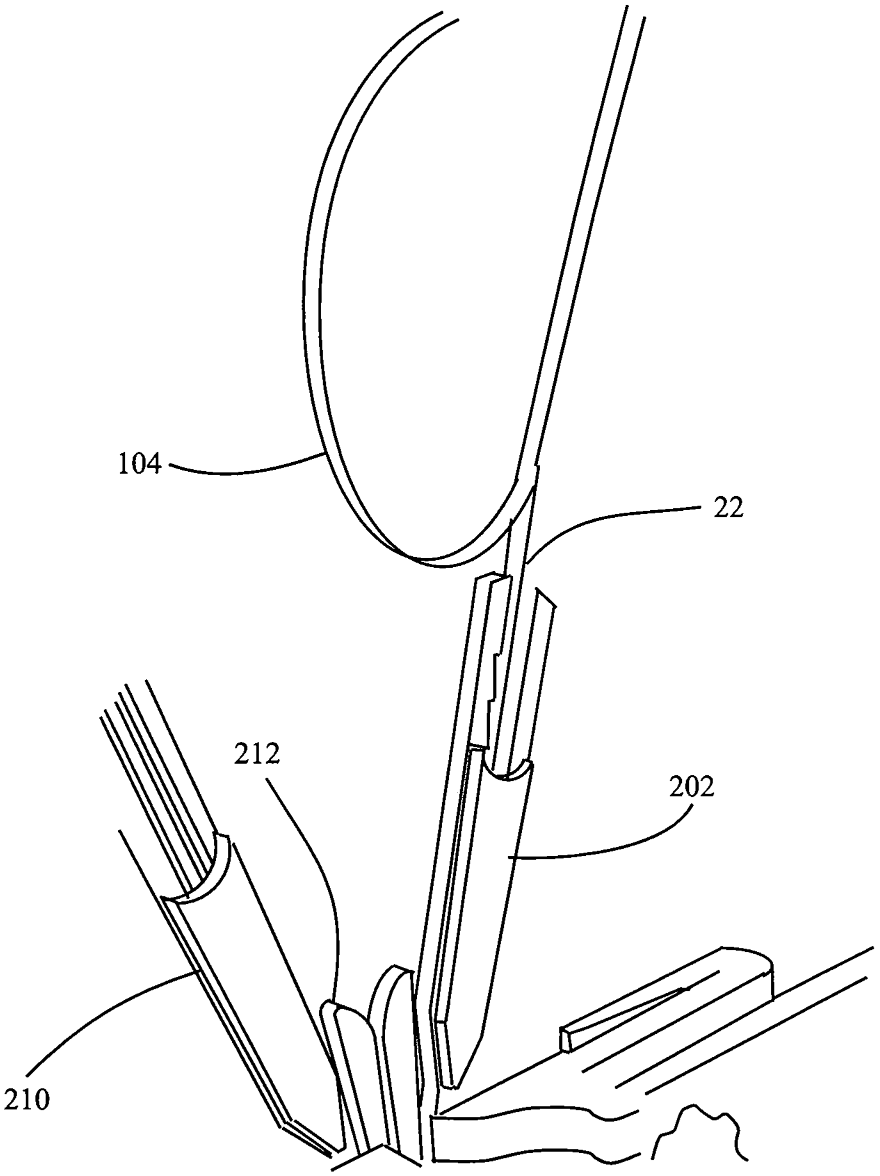
FIG. 16 shows a close up of the first strip of wood purfling, showing how the backing is pulled away from the side of the purfling as it is fed into the guide of the jig, uncovering an adhesive layer for attachment to the shell purfling strips.
Figure 17:
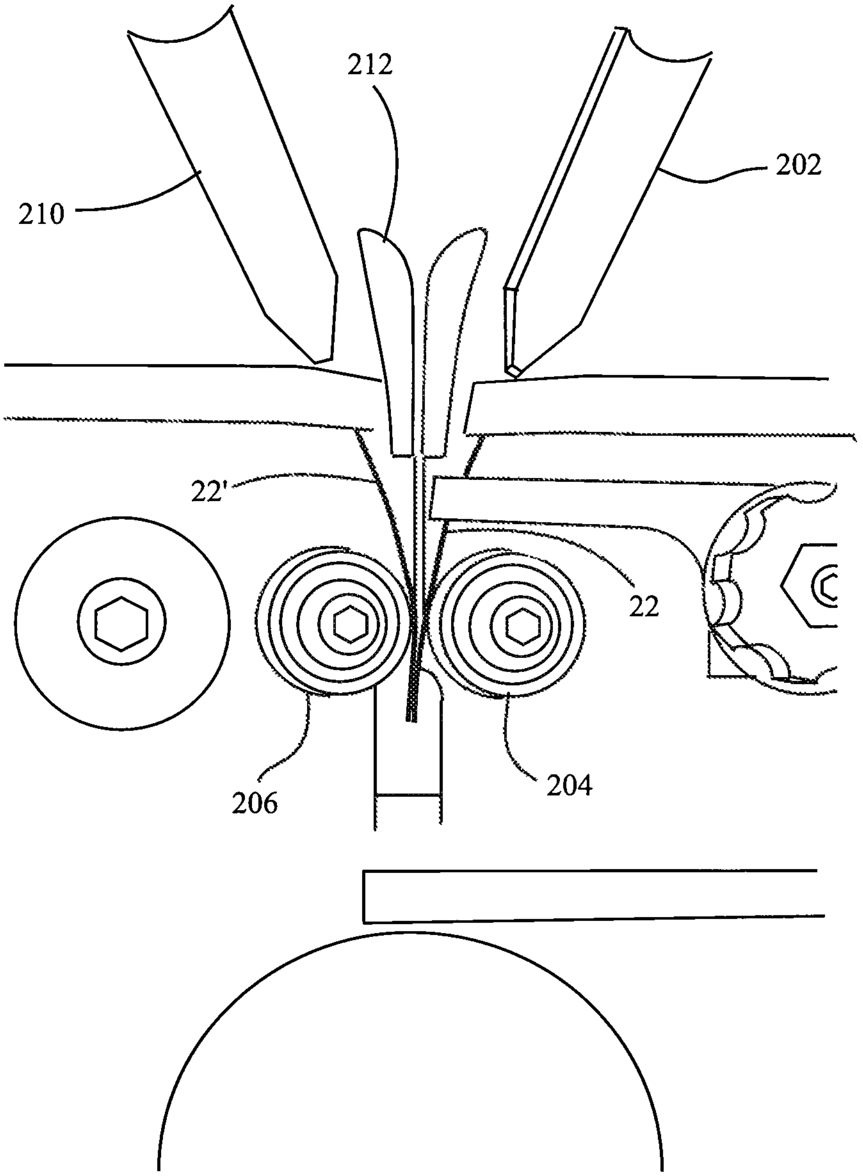
FIG. 17 shows the first strip and second strip of the wood purfling in position in the jig assembly prior to the insertion of a strip of the shell purfling.

Attachment of the shell purfling strips 100 to wood purfling strips may be facilitated by using a jig 200 such as that illustrated in FIG. 15. As shown in FIG. 15, wood purfling strip 22 is fed into upper guide 202, which guides the wood purfling strip 22 into a pair of opposite facing rollers 204 and 206. Spacing between rollers 204 and 206 is controlled by tensioning assembly 208. Support purfling 22' is fed into lower guide 210. The support purfling 22' is used to support and protect the shell purfling strip 100, which is fed into the center guide 212 of the jig. The shell purfling strip is only attached to wood purfling strip 22, and is not attached to support purfling 22'. As shown in FIG. 16, the adhesive of wood purfling strip 22 is exposed by the pulling back of the backing 104 from the wood purfling strip 22. As shown in FIG. 17, wood perfling strip 22 and supporting wood perfling strip 22' are fed into rollers 204 and 206. Shell purfling strip 100 is thereafter fed into center guide 212, where downward pressure asserted on the shell purfling strip can be adjusted with adjustable dog 214. As a first shell purfling strip is attached to wood purfling strip 22, a second shell purfling strip can be fed into the device directly after the first, such that the entire length of the wood purfling strip has shell purfling strips attached in a side-by-side configuration. Cutout 216 allows the operator greater access to pull the purfling strips through the mechanism. The completed shell/wood purfling member 102 is removed from the jig 200 and ready for installation in a work piece.

The wood purfling strip 22 is affixed to only side of the shell purfling strip 100 to allow the combined purfling member 102 to be installed in tight curves. The combined purfling member 102 simply lays into a pre-formed channel 32 in the work piece with the other, un-attached, wood purfling strip 22. If the work piece is a musical instrument, the entire soundboard can be inlaid in this fashion in minutes, which is many times faster than the industry standard for inlaying a soundboard with shell purfling around the perimeter.

While the above is a description of various embodiments of the present invention, further modifications may be employed without departing from the spirit and scope of the present invention. Thus the scope of the invention should not be limited according to these factors, but according to the following claims.

What is claimed is:

1. A method of manufacturing a laminated strip of inlay material comprising the following steps:

mounting a sheet of organic shell matter to a rigid substrate with a water soluble adhesive;

cutting the sheet of organic shell matter into a plurality of parallel strips, the parallel strips each comprising a front side attached to the rigid substrate and an exposed back side;

attaching a panel of binding material to the exposed back sides of the parallel strips;

cutting the panel of binding material such that each parallel strip has an overlying portion of binding material attached to the back side of the strip;

removing the parallel strips from the rigid substrate by dissolving the water soluble adhesive, resulting in a plurality of laminated strips of inlay material, wherein each strip has a first layer of organic shell matter and a second layer of binding material; and introducing a plurality of breaks in the first layer of organic shell matter while leaving the second layer of binding material intact.

2. The method of claim 1 wherein the binding material comprises acetate.

3. The method of claim 1 wherein the binding material comprises polyurethane.

4. A method of manufacturing a laminated strip of inlay material comprising the following steps:

mounting a sheet of organic shell matter to a first rigid substrate with a water soluble adhesive;

cutting the sheet of organic shell matter into a plurality of parallel strips, the parallel strips each comprising a front side attached to the rigid substrate and an exposed back side;

removing the parallel strips from the rigid substrate by dissolving the water soluble adhesive, resulting in a plurality of strips of organic shell matter;

mounting the strips of organic shell matter to a second rigid substrate with a water soluble adhesive, such that the strips are arranged in parallel with one another, the parallel strips defining a long axis, with the sides of adjacent strips abutting one another, the parallel strips each comprising a front side attached to the second rigid substrate and an exposed back side;

attaching a panel of binding material to the exposed back sides of the parallel strips;

cutting the panel of binding material and the underlying parallel strips of organic shell matter at ninety degrees to the long axis, resulting in a plurality of parallel strips, each strip having a laminated structure, the laminated structure comprising a first layer of binding material and a second layer comprising a plurality of segments of organic shell matter; and removing the parallel laminated strips from the rigid substrate by dissolving the water soluble adhesive, resulting in a plurality of laminated strips of inlay material.

5. The method of claim 4 wherein each laminated strip of inlay material comprises defines a longitudinal axis, and each laminated strip comprises a first side and an opposite facing and parallel second side.

6. The method of claim 5 wherein a reinforcement member is attached to the first side of the laminated strip.

7. The method of claim 6 wherein the reinforcement member comprises a strip of wood purfling.

8. The method of claim 4 further comprising the step of sequentially attaching a plurality of laminated strips of inlay material in end-to-end configuration to a strip of wood purfling.

* * * * *